(12) United States Patent
Koelle

(10) Patent No.: US 8,511,027 B2
(45) Date of Patent: Aug. 20, 2013

(54) DEVICE FOR MOUNTING AND LOCKING A CASING TO A SUSPENSION

(75) Inventor: Helmut Koelle, Augsburg (DE)

(73) Assignee: Boewe Systec GmbH, Augsburg (DE)

( * ) Notice: Subject to any disclaimer, the term of this patent is extended or adjusted under 35 U.S.C. 154(b) by 0 days.

(21) Appl. No.: 13/206,734

(22) Filed: Aug. 10, 2011

(65) Prior Publication Data

US 2012/0038256 A1     Feb. 16, 2012

Related U.S. Application Data

(60) Provisional application No. 61/372,494, filed on Aug. 11, 2010.

(30) Foreign Application Priority Data

Aug. 11, 2010   (DE) .......................... 10 2010 039 215

(51) Int. Cl.
*E04B 2/00*     (2006.01)

(52) U.S. Cl.
USPC ...................................... 52/506.05

(58) Field of Classification Search
USPC ............... 52/489.1, 475.1, 506.05, 509, 511, 52/238.1, 127.6, 127.8, 127.9, 127.11, 716.7; 292/80, 81, 87, 89, 194, 219, 220, 228, 195, 292/202, 209, 210, 256, 303, DIG. 16, DIG. 61
See application file for complete search history.

(56) References Cited

U.S. PATENT DOCUMENTS 5,191,745 A * 3/1993 Story .......................... 52/506.05

FOREIGN PATENT DOCUMENTS

| DE | 2 157 233 A1 | 5/1973 |
|---|---|---|
| DE | 298 22 313 U1 | 4/1999 |
| DE | 10 2007 059 213 A1 | 6/2009 |

OTHER PUBLICATIONS

English translation of Official Communication issued in corresponding German Patent Application No. 10 2010 0390215.4, mailed on Mar. 21, 2011.

* cited by examiner

*Primary Examiner* — William Gilbert
*Assistant Examiner* — Gisele Ford
(74) *Attorney, Agent, or Firm* — Keating & Bennett, LLP

(57) ABSTRACT

A device for mounting an locking a casing to a suspension includes a first portion arranged to engage a first side of the suspension, a second portion effectively connected to the first portion and a locking element arranged on the second portion at a distance from the first portion, wherein the distance is such that the locking element engages a second side of the suspension at least when the first portion disengages the first side of the suspension, wherein the locking element is biased in the direction of the suspension.

15 Claims, 12 Drawing Sheets

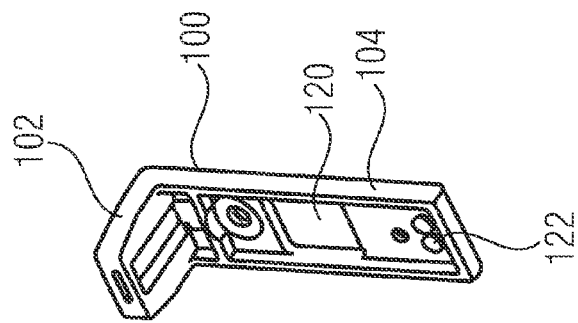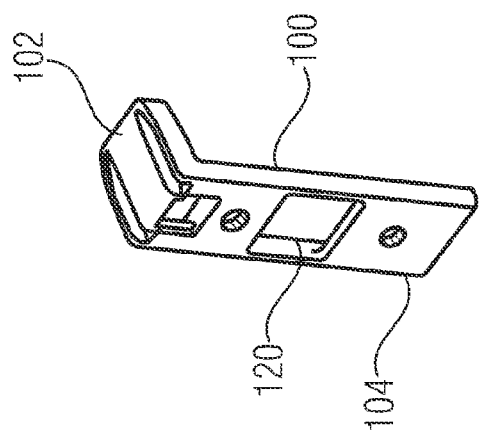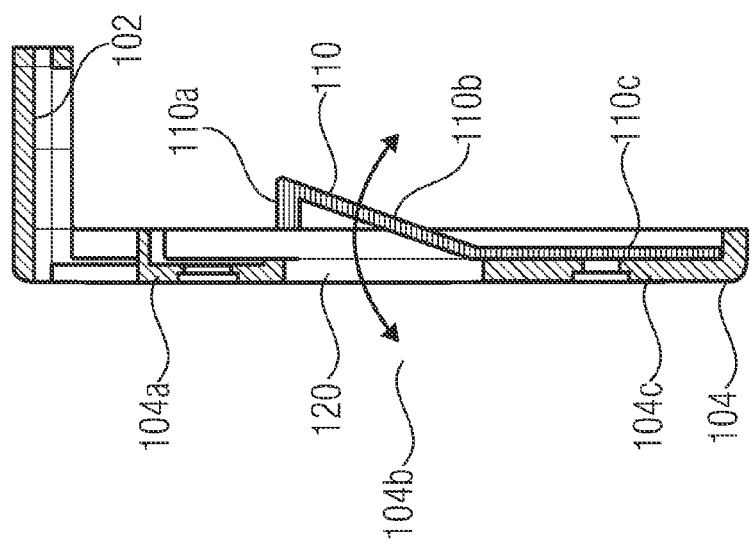

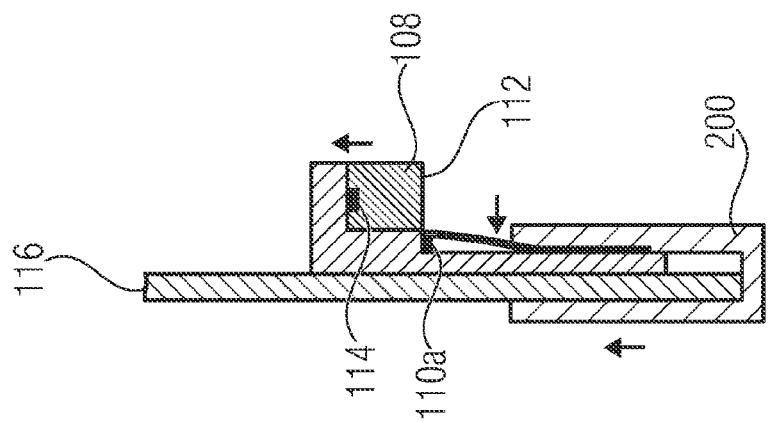
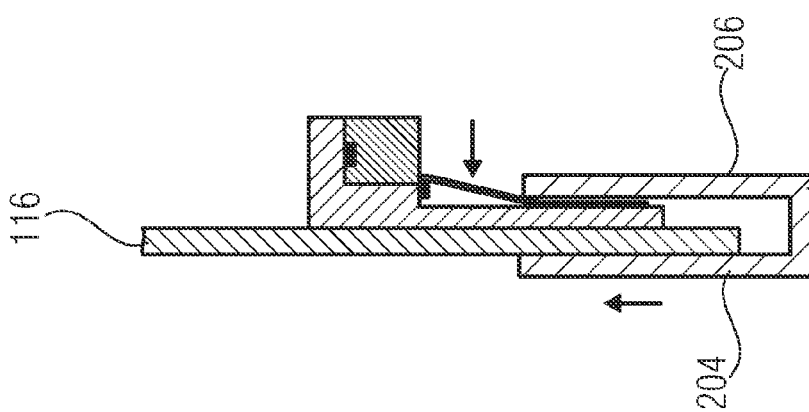
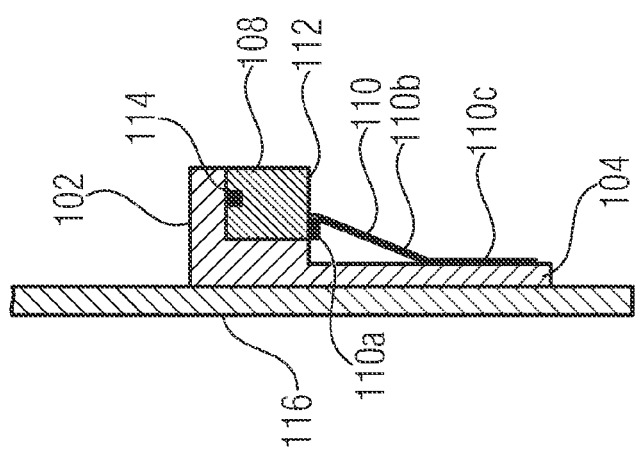

DEVICE FOR MOUNTING AND LOCKING A CASING TO A SUSPENSION

CROSS-REFERENCE TO RELATED APPLICATIONS

This application claims priority from German Patent Application No. 102010039215.4, which was filed on Aug. 11, 2010, and from U.S. application No. 61/372,494, which was also filed on Aug. 11, 2010, which are both incorporated herein in their entirety by reference.

BACKGROUND OF THE INVENTION

The present invention relates to the field of casings and protective covers in general, and in particular to machine casings and protective covers arranged on the rack or frame of the machine.

In machine and plant engineering, machines or plants or their components are provided with a casing arranged, for example, on the machine or on the component or on a rack or support, for different reasons, for example for noise protection or safety reasons. Various safety guidelines exist which necessitate casing of the machine, for example for protecting users of the machines from parts moving during operation or from current of voltage-carrying parts. One example of such plants are the applicant's paper-handling plants for handling and/or enveloping goods, such as letters and the like.

FIG. 8 shows a photographic illustration of one of the applicant's paper-handling plants for combining and enveloping goods. Three plant modules can be seen in the embodiment shown in FIG. 8, wherein it is irrelevant for the purpose of the present application which function the actual plant modules fulfil. Each plant module comprises a frame or rack where the respective plant components are arranged, wherein vertical beams 800 can be seen in the example shown in FIG. 8. Further, the frames of the modules comprise cross-beams that cannot be seen in FIG. 8, wherein, for example, two cross-beams are provided on one side of the frame in order to connect two adjacent vertical beams with one another. One cross-beam is arranged in an upper portion of the module, and a second cross-beam is arranged on a lower portion of the module. A cover 802 is held on this cross-beam, for example such that the cover 802 includes respective elements by which the cover 802 is suspended into the cross-beams. Similarly, if necessitated, a casing is also suspended on the other sides of the module. Further, for head modules, such as the module shown on the left in FIG. 8, a casing is suspended at a head end, whereas the next module merely comprises a cover on opposite sides, the sides adjacent to other modules, however, being provided without any cover.

The cover 802 serves to separate the machine components from the environment, to provide protection of the machine components from environmental influences, but also to protect the persons operating the machine so that no accidents or injuries occur during operation of the machine, for example by reaching into the running plant. For this reason, the cover 802 is not only suspended into the cross-beams of the rack or frame of the machine, but additionally, such casings are usually locked or unlocked or released by means of a special tool in order to ensure that release of the cover is avoided also during operation, thus ensuring protection of the operating staff.

With unlocked casings, no sufficient protection is ensured since the casings are not held on the rack during operation of the plant, but, rather, can become loose due to the movement of the plant during operation, so that sufficient mounting of the casing on the rack or frame of the machine is only ensured by locking.

SUMMARY

According to an embodiment, a device for mounting and locking a casing to a suspension may have: a first portion arranged to engage a first side of the suspension; a second portion effectively connected to the first portion; and a locking element arranged on the second portion at a distance from the first portion, wherein the distance is such that the locking element engages a second side of the suspension at least before the first portion disengages the first side of the suspension, wherein the locking element is biased to a first position where the locking element projects over the second portion in the extension direction of the first portion in order to allow engagement with the second side of the suspension, and wherein the locking element can be moved to a second retracted position by overcoming the biasing force in the direction of the second portion to release the suspension.

According to another embodiment, a casing for mounting on a suspension may have: a panel plate; and a plurality of attachment devices mounted on an inside of the panel plate, wherein the plurality of attachment devices include at least one inventive locking device.

According to another embodiment, a system may have: a suspension; and an inventive casing arranged on the suspension and locked to the suspension.

According to another embodiment, a device for unlocking an inventive locking device mounted on a casing may have: an U-shaped body having a first leg and a second leg having a distance to each other determined by a thickness of the casing and/or a thickness of the second portion of the body of the locking device, wherein the legs have a length selected to receive part of the casing and part of the second portion of the locking device such that an upper end of a leg partly engages the locking element to move the locking element in a direction opposite to the first direction.

Embodiments of the invention provide a device for mounting and locking a casing to a suspension, comprising:
  a first portion arranged to engage a first side of the suspension;
  a second portion effectively connected to the first portion; and
  a locking element arranged on the second portion at a distance from the first portion, wherein the distance is such that the locking element engages a second side of the suspension at least when the first portion disengages the first side of the suspension,
  wherein the locking element is biased in the direction of the suspension.

Embodiments of the invention provide a casing for attachment to a suspension, comprising:
  a panel plate; and
  a plurality of attachment devices mounted on an inside of the panel plate,
  wherein the plurality of attachment devices include at least one locking device according to embodiments of the invention.

Embodiments of the invention provide a system comprising:
  a suspension; and
  a casing according to embodiments of the invention arranged on the suspension and locked to the suspension.

Embodiments of the invention provide a device for unlocking a locking device according to embodiments of the invention mounted on a casing, comprising:

an U-shaped body having a first leg and a second leg having a distance to each other determined by a thickness of the casing and/or a thickness of the second portion of the body of the locking device, wherein the legs have a length selected to receive part of the casing and part of the second portion of the locking device such that an upper end of a leg partially engages the locking element to move the locking element in a direction opposite to the first direction.

According to the invention, a new approach for arranging a casing or protective cover on a machine is disclosed, according to which, when pressing down the casing, a locking element, for example a leaf spring arranged on the casing, latches on a cross-beam of a rack or another member, e.g. a sheet-metal bracket. If no locking takes place, this is clearly visible from a distance, since in this case the locking element rests on the cross-beam or the other member, so that the casing clearly protrudes. The advantage of the inventive approach is that improved protection for the operating and service personnel is obtained since the casing is now securely held on the rack, but it is also clearly visible when the casing is not locked since the casing then protrudes over the edge of the machine. Thus, unintentional reaching into the running machine can be prevented. For adjustment operations or during defect detection, it is still possible to quickly put up or take down the casing.

A further advantage of the present invention is that no tool is necessitated for permanent locking, so that the operating personnel are sufficiently protected. Taking off the casing is, however, only possible by means of special tools which, according to embodiments of the invention, are pushed from the bottom over the casing and unlock the casing, wherein the unlocking device is implemented such that, when the casing is lifted, the same is pulled off the cross-beam of the rack or another member and falls to the floor. Alternatively, unlocking can take place by means of a hook, which extends through a small additional bore in the casing already existing in some casing elements, and a bore in the leaf spring, and allows pulling back of the leaf spring for unlocking the same.

Embodiments of the invention provide a device for mounting and locking a casing on a support having a body with a first portion and a second portion arranged substantially perpendicular or at an angle to each other, wherein the first portion is arranged to engage a top face of the support; and a locking element arranged on the second portion of the body at a distance from the first portion, wherein the distance is such that the locking element engages the bottom side of the support, wherein the locking element is biased in a first direction into which the first portion extends.

BRIEF DESCRIPTION OF THE DRAWINGS

Embodiments of the present invention will be detailed subsequently referring to the appended drawings, in which:

FIG. 1(a)-(c) is a locking element according to an embodiment of the invention, wherein FIG. 1(a) shows the locking element in a locked state, wherein FIG. 1(b) shows the locking element during a movement across a beam of a rack, and wherein FIG. 1(c) shows a position of the locking elements with suspended cover but without locking;

FIG. 2(a)-(c) are illustrations of a locking device according to a further embodiment of the invention, wherein FIG. 2(a) represents a sectional view of the device and FIGS. 2(b) and (c) show an isometric front or back view of the device of FIG. 2(a);

FIG. 6(a)-(c) are illustrations showing unlocking of a locking device according to an embodiment of the invention by means of an unlocking element according to FIG. 5;

DETAILED DESCRIPTION OF THE INVENTION

In the following description of the embodiments, the same or equal elements are provided with the same reference numbers. Further, it should be noted that the term plurality is used here to mean "at least two", "two or more" or "several".

Figure 1C:
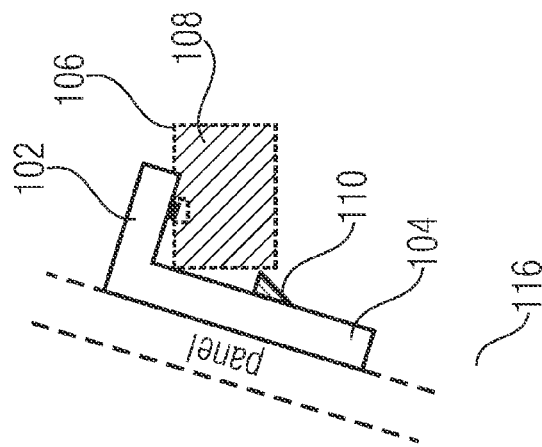
Figure 1B:
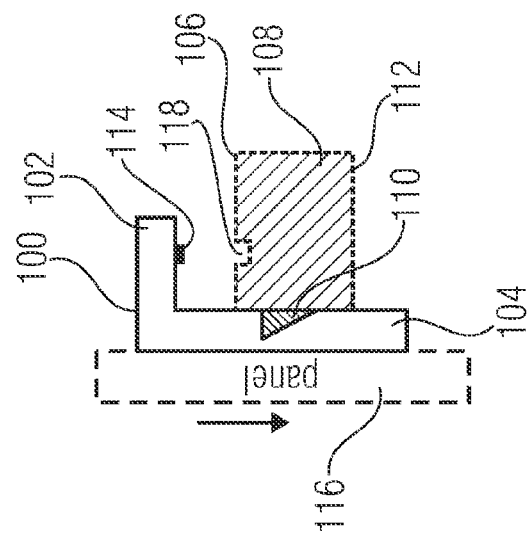
Figure 1A:
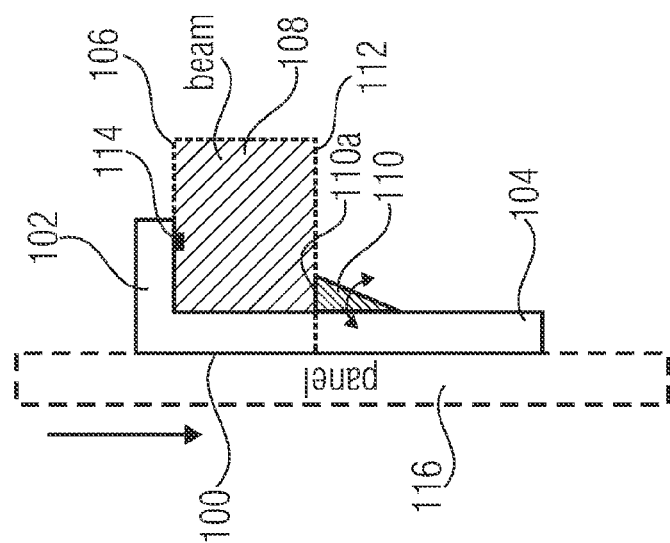

FIG. 1(a) shows an illustration of a locking device according to an embodiment of the invention. The locking device comprises a body 100 made, for example, of metal or plastic. In the embodiment shown in FIG. 1, the body 100 is implemented in an L shape and comprises a first portion 102 and a second portion 104 connected to each other and substantially arranged at a right angle to each other. In the embodiment shown in FIG. 1, the first portion 102 is arranged substantially horizontally in the locked state. The first portion 102 is in contact with a top side 106 of a beam 108 of a support rack. The second portion 104 is arranged substantially vertically and in parallel to a side surface of the beam 108. Further, the locking device comprises a locking element 110 arranged on the second portion 104 of body 102. The locking element 110 is movably arranged, as indicated by the arrow in FIG. 1(a), and biased in a direction corresponding to the direction in which the first portion extends. In other words, the locking element 110 is implemented such that it strives for the position shown in FIG. 1(a), but is movable in an opposite direction, namely in the direction of the second portion 104, by overcoming a biasing force. The locking element 110 comprises a portion 110a provided for engaging the bottom side 112 of beam 108. In the situation illustrated in FIG. 1(a), the beam 107 is thus arranged between the bottom side of the first portion 102 and the top side of portion 110a of the locking element 110. In order to achieve the desired locking effect, in the embodiment shown in FIG. 1(a), the first portion 102 comprises a lug 114 engaging a respective groove or recess in the top side 106 of the beam, such that in the position shown in FIG. 1(a) a vertical movement of the locking element is no longer possible due to the arrangement of the beam between portions 102 and 110a, and at the same time a horizontal movement is also no longer possible due to the engagement of the lug 110 with the groove in the beam, and thus the locking element is locked with the beam 108. In an alternative embodiment, instead of the lug 114, it can also be provided to implement the top portion 102 such that the same extends across the whole width of the beam 107 and ends in a hook-shaped terminal element to engage a side surface of the beam 108 opposite to the portion 104, in order to thus also obtain respective locking against a horizontal movement.

As is further shown in FIG. 1(a), the portion 104 of the body 100 is provided in order to be connected to a panel or a portion of the casing 116. As indicated by the vertical part in FIG. 1(a), arrangement of the locking device with the casing 116 mounted thereon takes place by a downward movement, such that the casing 116 is suspended on the beam 108 and locked to the same by means of the locking device.

FIG. 1(b) illustrates this process and shows a situation where the locking device and the casing 116 mounted thereon, is to be arranged and latched on the beam 108, and is just in a position in which the body 100 of the locking device passes the beam 108. As can be seen, the second portion 104 of the locking device is in contact with a side face of the beam 108, wherein due to the resilient bearing of the locking element 110 the same is in a retracted position, so that a passage of the locking device along the beam 108 is ensured. Further, the recess 118 formed on the top side 106 of the beam 108 can be seen in FIG. 1(b), in which the lug 114 of the first portion 102 of the body 100 of the locking device can be received. The distance between the bottom side of the first portion 102 of the body 100 and the portion 110a of the locking element 110 is selected such that the same corresponds to the thickness of the beam 108, i.e. the distance between top side 106 and bottom side 112, so that during a further movement of the locking device from the position in FIG. 1(b) along a direction indicated by the vertical arrow, the bottom side of the first portion 102 comes in contact with the top side 106 of the beam 108. At the same time, this has the effect that the locking element 110 is released, since the beam 108 is no longer pressing against the locking element 110, and the same is moved back to the locking position shown in FIG. 1(a) due to biasing, so that the locked position shown in FIG. 1(a) results.

Here, it should be noted that the implementation of the first portion 102 with a lug 114 represents one embodiment, but the invention is not limited to the same. Alternatively, the top side of the beam 108 can also be provided with a projection or a lug or the like for engagement with a respective recess or depression formed in the bottom side of the first portion 102 of the body 100 of the locking device.

If the locking device or casing with the locking device arranged thereon is not properly inserted, no locking results, but, rather, a situation results as is shown in an exaggerated manner in FIG. 1(c). Incorrect insertion has the effect that, in a situation where the top portion 102 of the locking device is already in contact with the top side 106 of the beam 108, the locking element 110 has not yet passed the beam 108. The spring force biasing the locking element 110 into the position shown in FIG. 1(a) is selected such that the same is sufficient to be larger than a force generated by the locking device and the casing 116 attached thereon, so that when the casing is released in a situation as is shown in FIG. 1(c), the spring force is sufficient to bring the locking element 110 back to the position shown in FIG. 1(c), so that the casing 116 is moved away from the beam 108 and hence projects over the edge of the machine, which is easily visible for anybody, so that faulty or non-existent locking can be easily detected and respective countermeasures, namely correct suspension of the casing, can be taken.

The locking element 110 can, for example, be implemented in the form of a leaf spring. Alternatively, a non-resilient element can also be provided, which is biased into the position illustrated in FIG. 1(a) by a respective spring and can be moved against the spring force into a position enabling the locking device to pass along the beam. For example, an element, made for example of metal or plastic, having a triangular cross-section can be pivot-mounted on the second portion 104 in order to be moved between the two named positions, wherein a respective pivot bearing is arranged on a lower part of the second portion 104, and a respective spring element or another resilient means cooperates with the locking element in an upper area in order to effect biasing into the position shown in FIG. 1(a).

In another embodiment, the locking element can be implemented as a snap element, where a spring force is selected such that the same is smaller than a force caused by the casing.

Figure 1D:
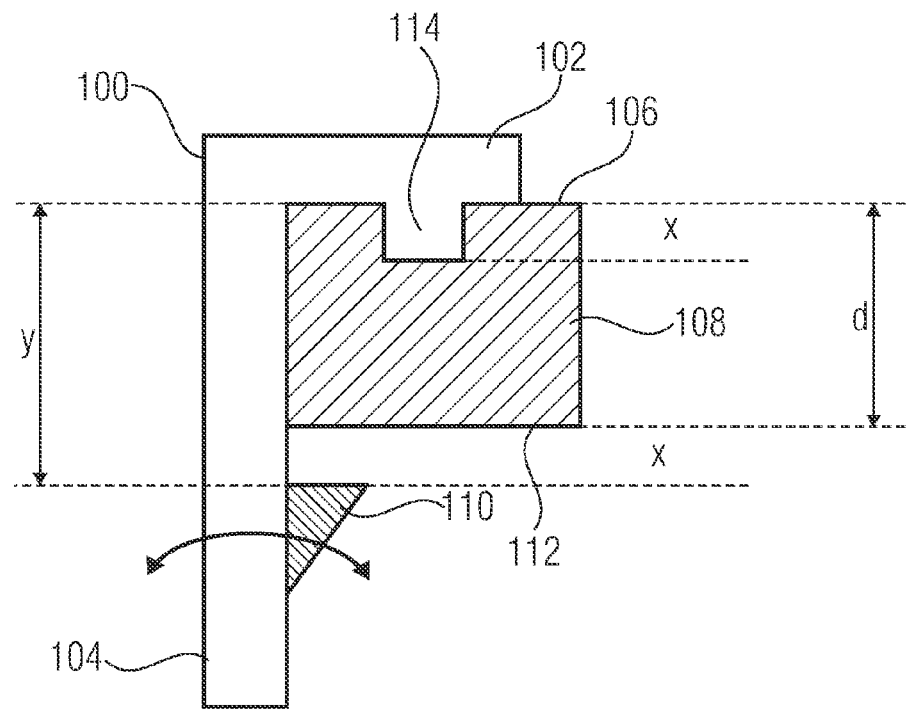
FIG. 1(d)-(e) is a locking element according to another embodiment of the invention.
Figure 1E:
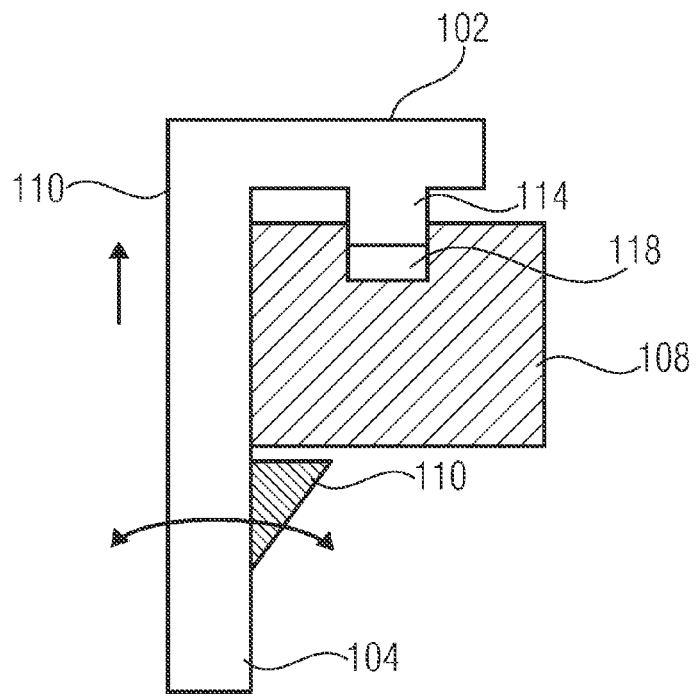

In the following, a locking element according to another embodiment of the invention will be described based on FIGS. 1(d) and 1(e). In the embodiment described based on FIGS. 1(a)-(c), the first portion is arranged to engage the top side of the support, and the locking element is arranged on the second portion of the body at a distance from the first portion which is such that the locking element engages the bottom side of the support. In such an embodiment, the distance corresponds approximately to the thickness of the support. However, the invention is not limited to such an implementation, as will be explained below. FIG. 1(d) shows an embodiment where the distance y between the first portion 102 and the locking element 110 is larger than the distance d between the first side 106 (e.g. the top side) of the support 108 and the second side 112 (e.g. the bottom side) opposite the first side. The distance y is selected such that vertical movement of the body 100 is possible, but only as far as the projection 114 remains in the groove 118. More precisely, the distance y is selected such that the locking element 110 engages the second side 112 of the support 108 before the projection 114 can leave the groove 118. The distance y can be determined, for example, by the thickness d of the support 108 and the depth of the groove 118 (y<d+x).

So far, embodiments have been described where the locking element 110 engages the second side 112 of the support 108—the bottom side. However, the invention is not limited to such an implementation, but, rather, according to embodiments of the invention, the first portion 102 can be provided for engaging the second side and the locking element 110 for engaging the first side. According to embodiments of the invention, the device shown based on FIGS. 1(a)-(e) can also be "inversely" mounted on and locked to the support.

Figure 1F:
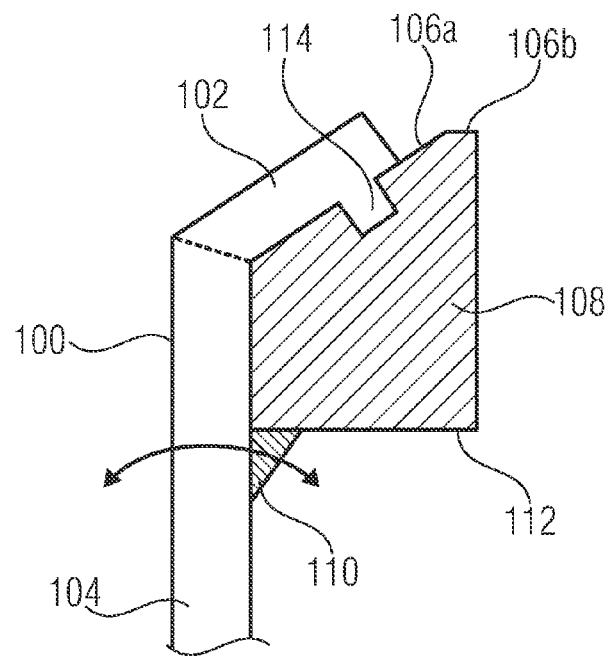
FIG. 1(f)-(g) are locking elements according to other embodiments of the invention for mounting on supports of different shapes.
Figure 1G:
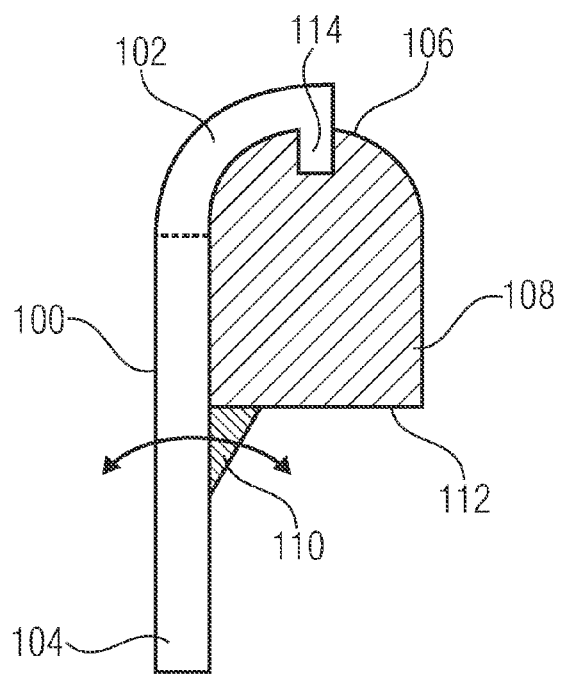

FIG. 1(f) and FIG. 1(g) show locking elements according to other embodiments of the invention for mounting on supports having different shapes. In the embodiment shown in FIG. 1(f), the first side 106 of the support 108 comprises a first portion 106a, which is implemented in a manner inclined to horizontal, and a horizontal portion 106b (alternatively, also, the whole side 106 can be inclined). In this case, the first portion 102 and the second portion 104 of the body 100 are arranged at an angle, which is given approximately by the angle of the incline 106a to the bottom side 112 or to the horizontal.

In the embodiment shown in FIG. 1(g), the first side 106 of the support 108 is implemented in a bent shape (a circular arc in cross-section). In this case, the first portion 102 is shaped according to the shape of the first side 106 of the support. The second portion 104 of the body 100 abuts on the first portion 102, as is shown in FIG. 1(g). The projection 114 can be arranged at the end of the first portion 102 or at another position between the end and the connection to the second portion 104, corresponding to the position of the groove in the first side 106 of the support 108.

Figure 1H:
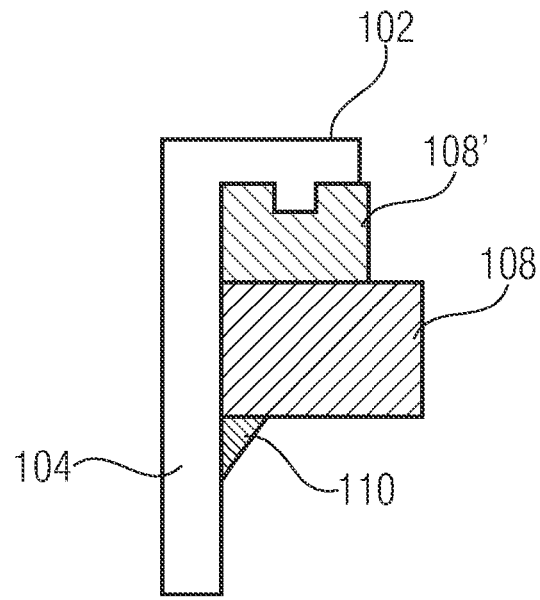
FIG. 1(h)-(i) are examples of further suspensions according to embodiments of the invention for mounting.
Figure 1I:
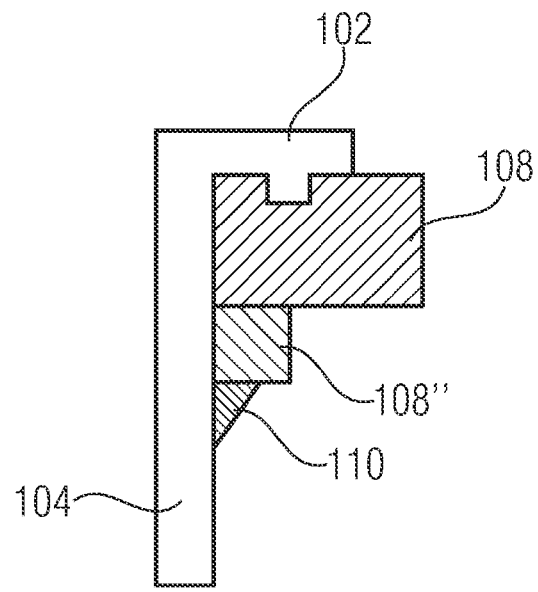

FIG. 1(h) and FIG. 1(i) show examples of further suspensions according to embodiments of the invention. In the previous embodiments, the mounting device was mounted on a support, e.g. a cross-beam of a machine rack or the like. However, the invention is not limited to such implementations, but, rather, the mounting device according to embodiments can be used with any suspension. Instead of a beam or another rack part, an appropriately shaped suspension can be provided at a machine, which is engaged by the portions of the mounting device. Alternatively, the cross-beams of the rack can also be provided with additional elements at certain positions where the mounting device grips. FIG. 1(h) shows an implementation where the suspension is formed, for example, by the support 108 and a further element 108' on the support 108 (e.g. with a smaller dimension than the support 108), wherein the further element 108' is only arranged in the area where the mounting device is to engage the suspension. Alternatively, as shown in FIG. 1(i), an element 108" can be mounted on the bottom side of the support 108'. Also, a combination of the elements 108' and 108" of FIG. 1(h) and FIG. 1(i) can be provided. Instead of mounting the elements 108' and 108" on the support, the same can also be mounted directly on a machine.

According to embodiments of the invention, the body 100 can be integrally implemented. Alternatively, portions 102 and 104 can also be produced separately and connected by appropriate measures, e.g. by soldering, adhering, welding, etc.

FIG. 2 shows a locking device according to another embodiment of the invention. FIG. 2(a) shows a sectional view of the device comprising the body 100 with portions 102 and 104. Further, the locking element 110 is shown mounted on the second portion 104. The second portion 104 includes a top portion 104a arranged adjacent to the first portion 102. At the upper portion 104a, a central portion 104b abuts as well as a lower portion 104c. In the embodiment shown in FIG. 2(a), the locking element 110 includes a leaf spring including the portion 110a provided for engaging the bottom side of the beam, wherein the portion 110a is formed by respectively shaping the material of the leaf spring 110. Further, the leaf spring 110 comprises a portion 110b and a portion 110c. The portion 110c is appropriately mounted on the second portion 104, more precisely to the lower portion 104c, for example by tamper-proof bolting (e.g. only accessible from the inside), riveting or casting the leaf spring 110 into the material of the locking device which can, for example, be made of plastic. The leaf spring 110 is shaped such that the central portion 110b of the same extends from the mounted portion 110c in a direction away from the second portion 104 of the body, wherein, due to the elasticity of the material of the leaf spring 110, movement of this portion becomes possible, as is shown by the plotted arrow. In the embodiment shown in FIG. 2(a), an opening 120 can be provided in the central area 104b of the second portion 104, wherein further an opening can be provided in the portion 110b of the leaf spring 110 that is aligned with the opening 120. Then, via such a sequence of openings and a respective opening also provided in the casing, an unlocking tool can be used which is, for example, provided with a hook in order to engage the portion 110bg of the leaf spring 110 and to move the same in the direction of the portion 104 to effect unlocking of the device, more precisely to move the portion 110a such that the same no longer engages the bottom side of the beam (see FIG. 1).

FIGS. 2(b) and (c) show an isometric front or back view of the locking device described based on FIG. 2(a). The illustrations shown in FIGS. 2(b) and (c) merely show the body 100 without locking element. In the illustrated embodiment, the body 100 can also be made of plastic and the leaf spring made of metal is mounted on the same after the production of the body 100. For this purpose, for example, one or several projections 122 can be provided in the lower area 104c of portion 104. The lower portion 110c of the leaf spring 110 comprises openings for receiving the projections 122. After arranging the leaf spring in the body 100, the projections 122 can be reshaped, for example by thermal treatment or the like, so that a riveting-type connection between the body 100 and the leaf spring results.

Figure 3:
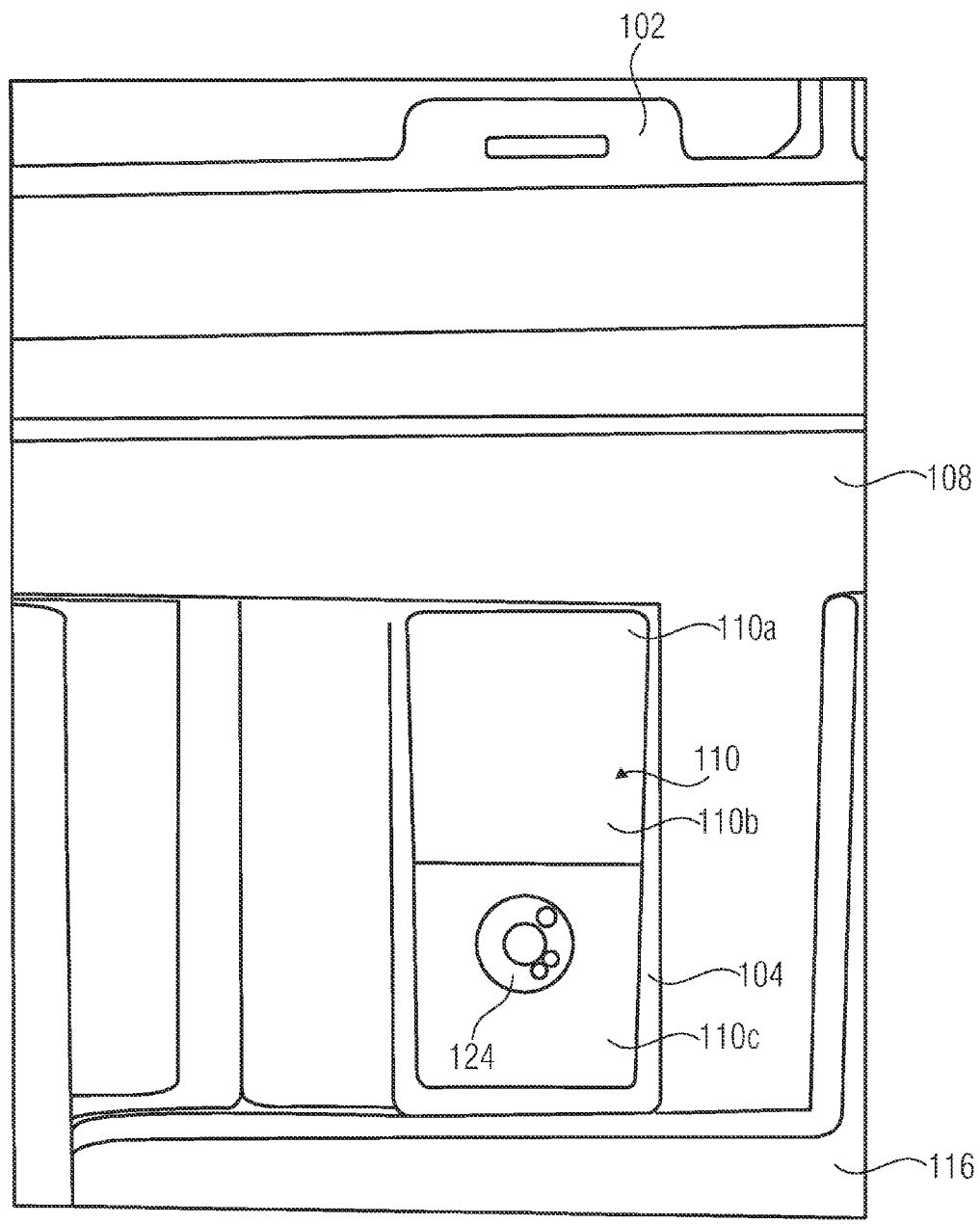
FIG. 3 is a photographic illustration of a locking device according to an embodiment of the invention in a state locked with a cross-beam.

FIG. 3 shows a photographic illustration where a portion of a casing 116 is shown, including a locking device according to embodiments of the invention, which is mounted on the same, wherein a portion is shown illustrating how the locking operation on the beam 108 takes place. In the embodiment shown in FIG. 3, the locking device includes the top portion 102 that is in contact with the top side of the beam 108, as well as the leaf spring 110 whose portion 110a, as can be seen, projects in order to be in contact with the bottom side of the beam 108. In the embodiment shown in FIG. 3, the leaf spring 110 can be mounted by means of a tamper-proof screw 124, wherein in this case the screw 124 can simultaneously serve for mounting the locking device on the casing 116. Other versions of the above-mentioned mounting options are also possible.

Figure 4C:
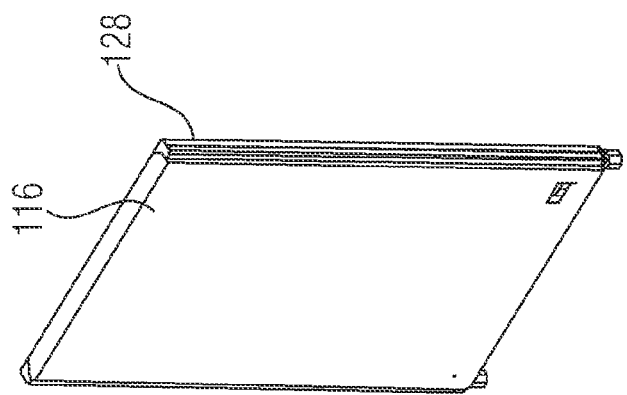
FIG. 4(a)-(c) are different views of a casing according to embodiments of the invention.
Figure 4B:
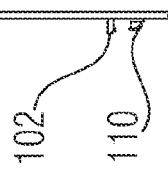
Figure 4A:
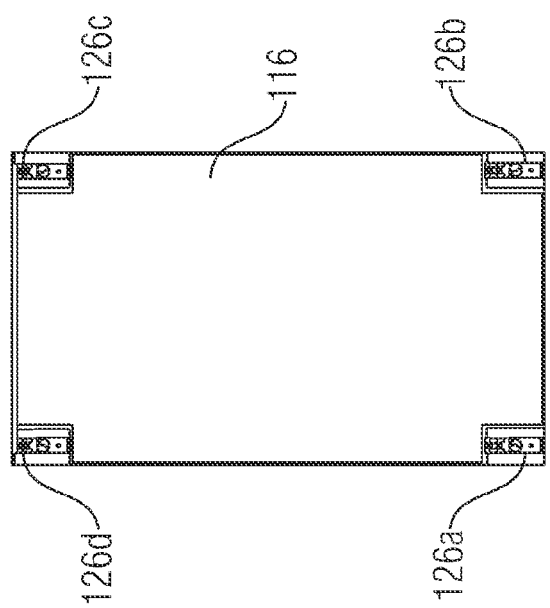

FIG. 4 shows different views of a casing 116, wherein FIG. 4(a) shows a view of the inside of the casing 116. The casing 116 is made, for example, of thin sheet metal, wherein one locking device 126a to 126d each is arranged at the four corners of the device 116. Elements 126c and 126d arranged in the upper area of the cover 116 have no locking function in the embodiment shown and are formed, for example, by an element as shown in FIG. 2(a) which, however, does not include a leaf spring 110. Alternatively, other attachment devices can be used, for example simple hooks or latching elements. Thus, elements 126c and 126d allow merely suspension of an upper part of the cover 116 on a top beam of a machine frame or a rack. The lower locking elements 126a and 126b are implemented according to embodiments of the invention, i.e. include the locking element 110. The lower locking elements 126a and 126b are, for example, elements as described based on FIG. 2(a).

FIG. 4(b) shows a side view of the casing 116 of FIG. 4(a), wherein FIG. 4(b) shows the locking element 110 of the lower locking devices. FIG. 4(c) shows the casing 116 suspended on part of a frame, wherein FIG. 4(c) shows a vertical beam 128 of the frame. A further vertical beam not shown in FIG. 4(c) is provided in parallel to the beam 128, and the two beams are connected to each other by respective cross-beams, an upper cross-beam and a lower cross-beam, wherein the upper devices 126c and 126d engage the top cross-beam, and the lower locking devices 126a and 126b are engaged with the lower cross-beam and at same time lock the same in the above-described manner by using the locking element 110, so that the casing 116 can be attached and latched to the cross-beams by simple suspending, and thus can be arranged in a reliable state without any special tool. For releasing the casing 116 from the frame, a special tool is necessitated, for example, the hook already briefly mentioned above that can be provided for pulling back the leaf spring 110, and can be inserted through an opening 130 in the casing 116 aligned with the openings 110 in the first portion 104 and an opening in the leaf spring, in order to pull the leaf spring back from the locked position. As an alternative to such an approach, a specific tool, which will be explained in more detail below, can be used.

Thus, the inventive locking device ensures that a casing 116 can be mounted easily on a machine rack and can be securely latched with the same without necessitating special tools, so that simple installation is ensured. However, at the same time, it is ensured that opening the casing without additional special tool is not possible, so that the necessitated security is given.

An unlocking device according to embodiments of the invention used for unlocking a casing 116 that is locked to a machine rack by use of a locking device according to embodiments of the invention will be discussed below.

Figure 5:
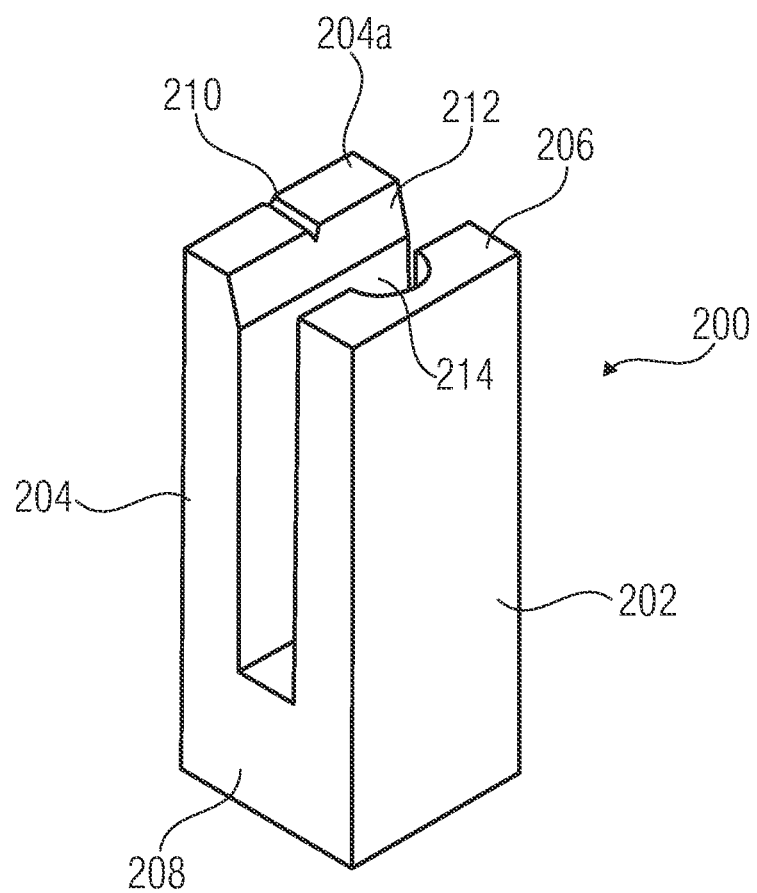
FIG. 5 is an illustration of an unlocking device according to an embodiment of the invention.

FIG. 5 shows an isometric view of an unlocking device 200 according to an embodiment of the invention. The unlocking device 200 includes a U-shaped body 202 including a first leg 204 as well as a second leg 206. A lower part 208 of the U-shaped body 202 connects the two legs 204 and 206. The distance between the legs 204 and 206 depends on the thickness of the casing 116 (see FIG. 4) and/or the thickness of the portion 104 of the locking device is selected such that the same can be received between the two legs 104 and 206. An upper surface 204a of the first leg 204 includes a mark 210, for example in the form of a notch, for indicating to the user the positioning of the device 200 on a mounted casing 116, as is shown, for example, based on FIG. 4(c). A top portion 212 of the inner surface of the leg 204 is inclined for simplifying insertion of the device 200 via the casing 116. The second leg 208 can include a semicircular recess 214 provided for locking devices mounted on the casing by means of a screw 124 (see FIG. 3). This screw can project over the thickness of the portion 104 and can then be received in the recess 114 of the device 200.

Based on FIG. 6, the functionality of the unlocking device shown in FIG. 5 will be discussed in more detail. FIG. 6a shows an arrangement where the locking device mounted on the casing 116 is locked to the beam 108 in a manner explained in more detail based on FIG. 1(a). For effecting unlocking, the unlocking device 200 described based on FIG. 5 is used, which is inserted from the bottom in the manner shown in FIG. 6(b), namely such that the cover 116 is lifted up between the legs 204 and 206. Upwards movement of the device 200 has the effect that a top portion of the leg 208 engages the central portion 110b of the leaf spring 110 and moves the same in a direction of the portion 104 of the locking device, so that in a further upward movement of device 200 a situation occurs as is shown in FIG. 6(c), where the portion 110a of the leaf spring 110 no longer engages the bottom side 112 of the beam 108, so that the locking device with the casing 116 mounted on the same can be moved upward so far that the lug 114 no longer engages the beam 118 and thus the casing 116 can be removed. The unlocking device 200 is dimensioned such that the same engages in the fully inserted position, as is shown in FIG. 6(c), with the central portion 110b of the leaf spring such that movement of the leaf spring against the biasing direction takes place, so that the portion 110a is moved to a fully retracted position where the same no longer engages the bottom side 112 of the beam 108. As can be seen from FIG. 6(c), this ensures that a sufficient distance exists between the upper edge of the unlocking device 200 and the bottom side 112 of the beam 108 allowing upward lifting of the overall arrangement including locking device, casing 116 and unlocking device 200 arranged thereon to an extent that the lug 114 no longer engages the beam 108, and thus removal of the overall arrangement becomes possible.

According to embodiments, the unlocking device 200 is produced such that the opposite legs 204 and 206 have a bias to each other, such that when inserting the device 200 in the manner described in FIG. 6 a clamping effect is obtained such that the unlocking device 200 remains independently in the shown position after attachment and reaching the position according to FIG. 6(c). After inserting all necessitated unlocking devices 200, no further support of the same is necessitated, so that a user can remove the casing 116 simply and with little effort. If the casing is moved upwards, removing the unlocking elements at the lower end of the casing can be effected simultaneously by engaging the beam. The unlocking device can be produced of metal or plastic, wherein in the case of production with plastic the device 200 is produced from a block of plastic material, for example by milling.

Figure 7A:
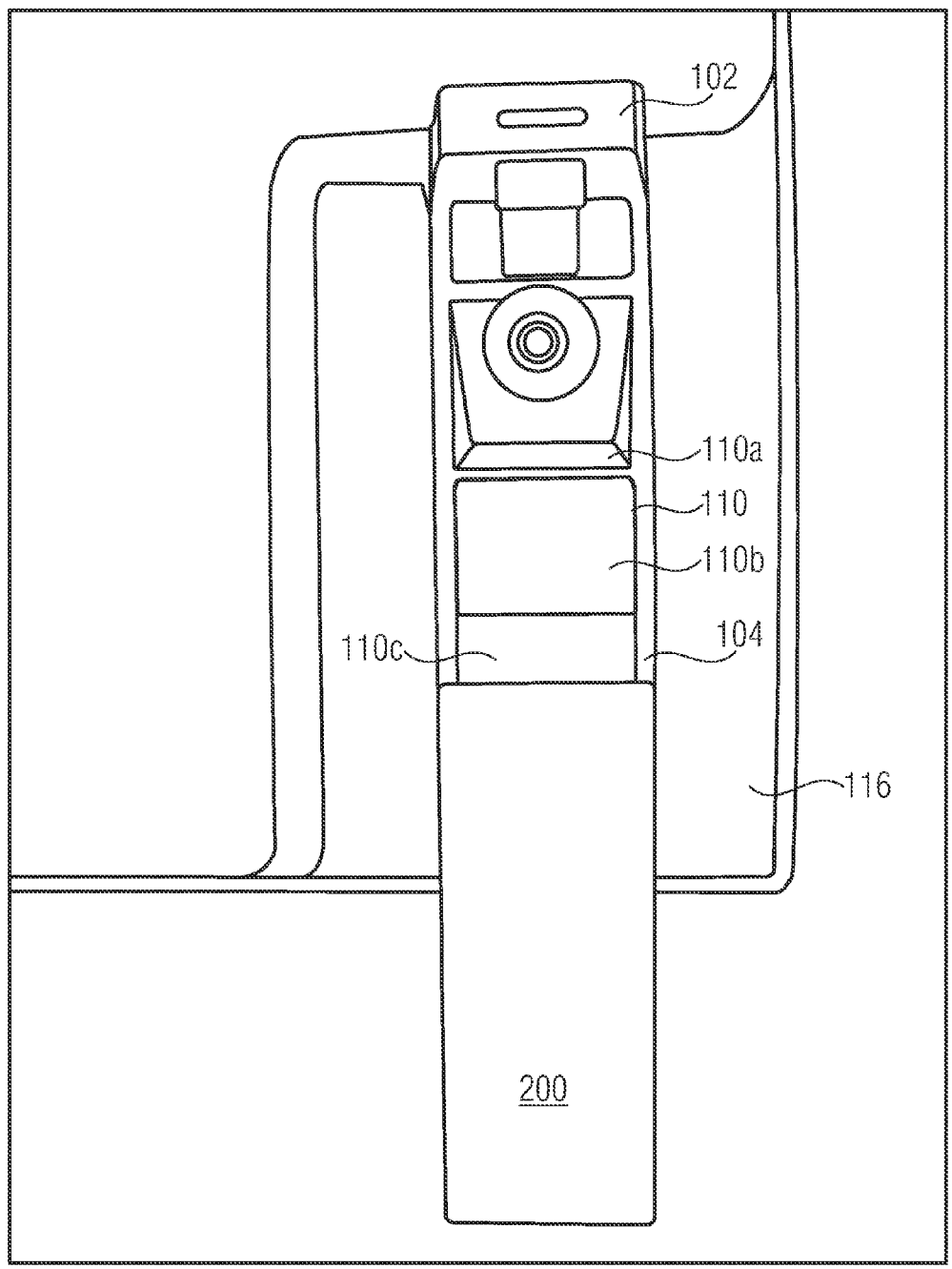
FIG. 7(a)-(b) are photographic illustrations of an unlocking operation.
Figure 7B:
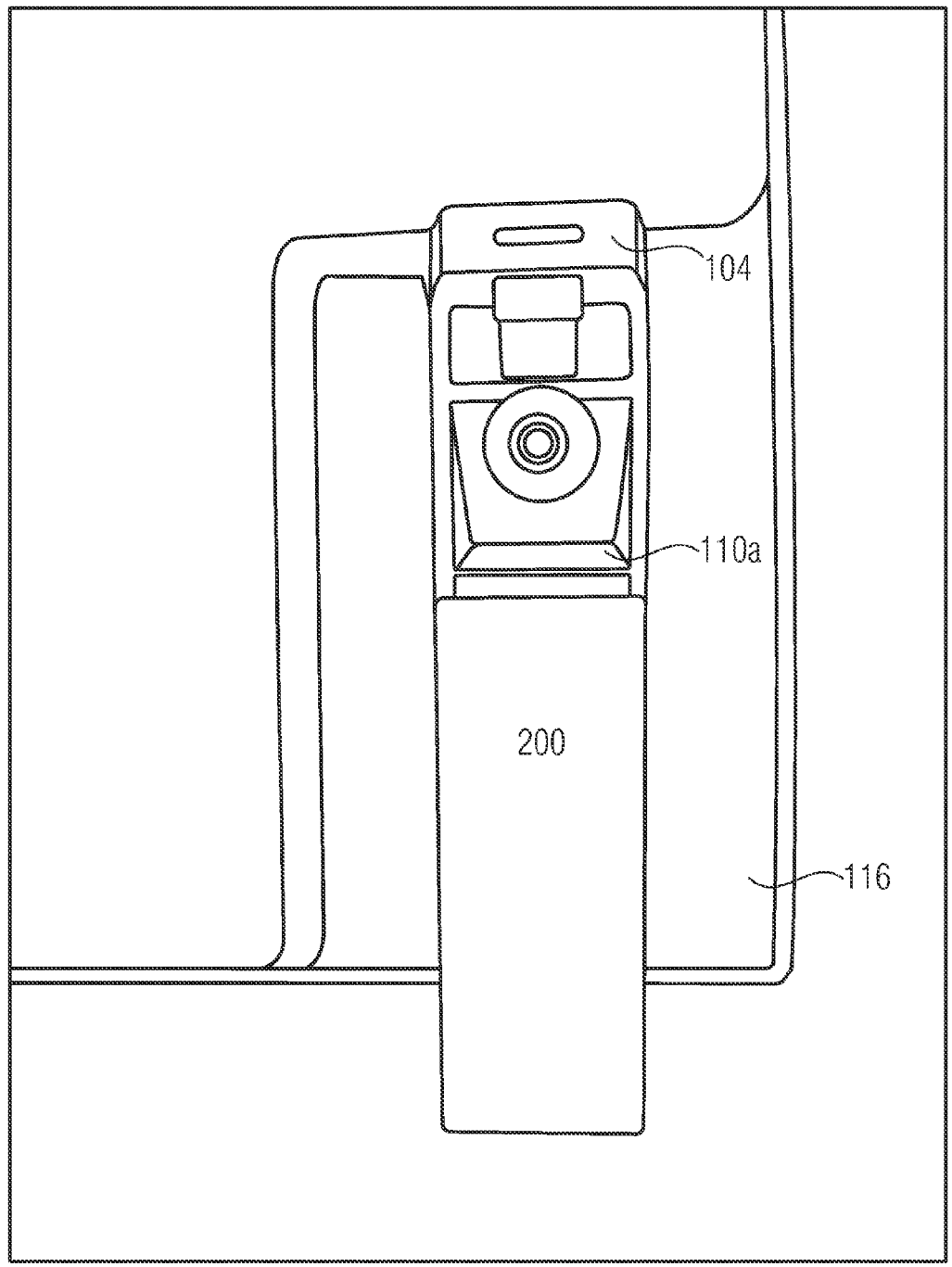
Figure 8:
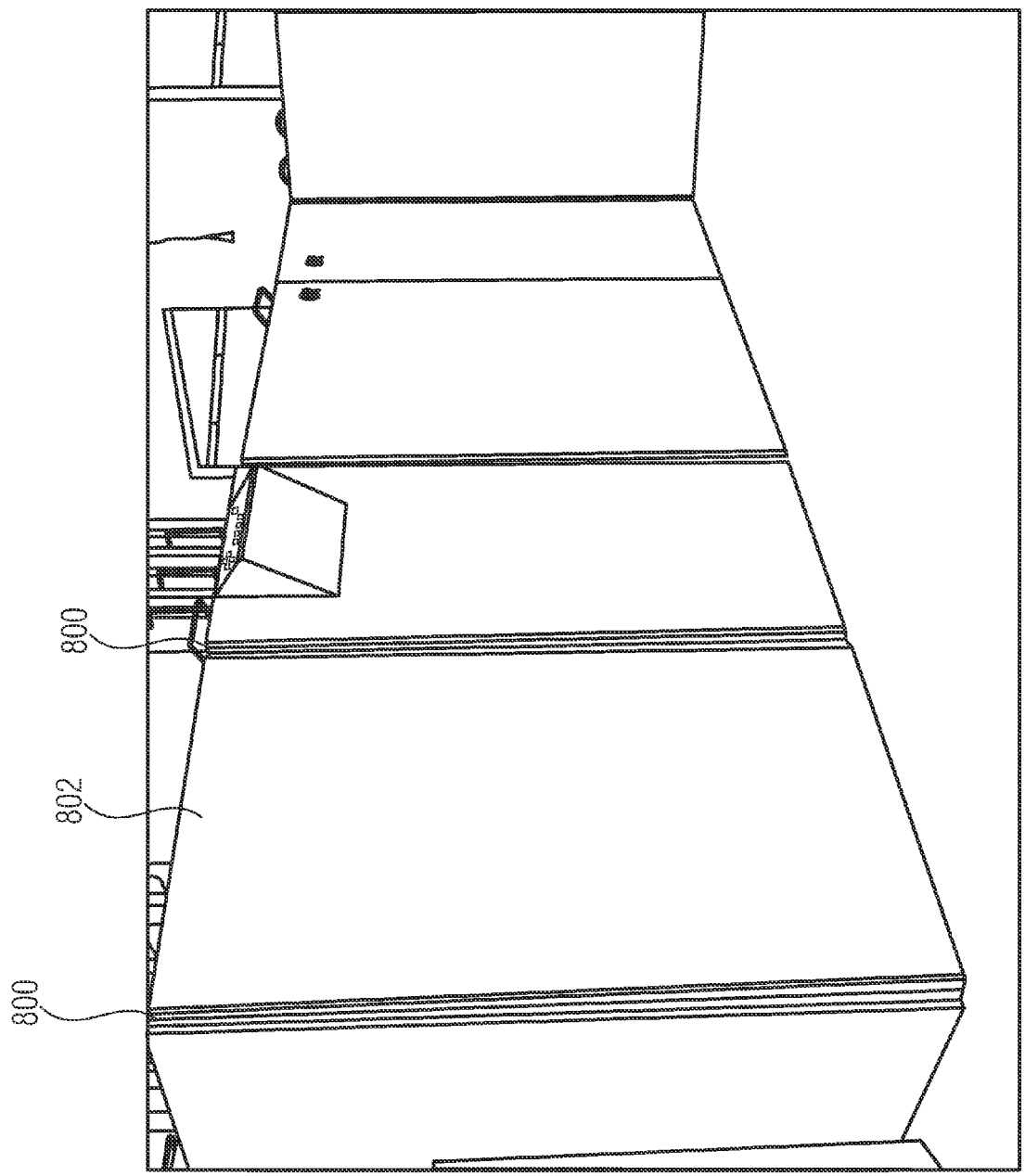
FIG. 8 is a photographic illustration of conventional casings arranged on a rack of a machine.

Based on FIG. 7, the functionality of the device will be explained again based on photographic illustrations, wherein in FIG. 7 for simplicity reasons the beam 108 is not shown. FIG. 7a shows an initial positioning of the unlocking device 200 where the same does not yet engage a portion of the leaf spring 110. The locking device 102 is attached and moved upwards into the position shown in FIG. 7(b), where the unlocking device 200 engages the central portion 110b of the leaf spring 110, so that the leaf spring is moved in the direction of the portion 104 against the spring force, so that the portion 110 is moved in the direction of the cover, such that the same no longer engages the beam, as has been described based on FIG. 6.

The above-described locking device and also the described unlocking device according to embodiments of the invention can be used on all casings and protective covers and are, particularly, not limited to casings and protective covers of machines or components of a paper-handling plant, such as feeders, compiling lines, inserters and the like. The locking and unlocking devices can be used for any casings that are to be suspended and locked on frames or mounting parts, wherein no tools are necessitated for permanent locking, and hence assembly is ensured in a simple manner. Unlocking and removing the casing, however, necessitates special tools, so that casings mounted on frame racks by using the locking devices according to embodiments of the invention also comply with respective safety directives.

The above-described embodiments merely present an illustration of the principles of the present invention. It is obvious that modifications and variations of the arrangements and details described herein will be obvious to other people skilled in the art. Thus, it is intended that the invention is merely limited by the scope of the following claims and not by the specific details presented based on the description and discussion of the embodiments herein.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Device for mounting and locking a casing to a suspension, comprising:
   a body including a first portion engaging a first side of the suspension and a second portion connected to the first portion, the second portion extending from the first portion; and
   a locking element mounted to the second portion at a distance from the first portion, wherein the distance is such that the locking element engages a second side of the suspension at least before the first portion disengages the first side of the suspension, wherein the locking element is biased to a first position where the locking element projects over the second portion in the extension direction of the first portion to engage with the second side of the suspension, and wherein the locking element is moved to a second retracted position by overcoming the biasing force in the direction of the second portion to release the suspension.

2. Device according to claim 1, wherein a first part of the locking element is mounted on the second portion of the body, and wherein a second part of the locking element projects over the second portion of the body in the direction of the suspension and is biased.

3. Device according to claim 2, wherein the second part of the locking element is biased to the first position for engaging the second part with the suspension, and wherein the second part of the locking element is movable to the second position against the biasing force to release the suspension.

4. Device according to claim 1, wherein the locking element comprises a leaf spring.

5. Device according to claim 1, wherein the second portion of the body and the locking element comprise openings aligned with each other, and an element for moving the locking element against the bias in the direction opposite to the extension direction of the first portion is inserted into the openings of the second portion of the body and the locking element.

6. Device according to claim 1, wherein the locking element is screwed, riveted or cast into the second portion of the body.

7. Device according to claim 1, wherein a surface of the first portion facing the suspension comprises a lug or a groove to engage with a groove or a lug of the suspension.

8. Casing for mounting on a suspension, comprising:
a panel plate; and
a plurality of attachment devices mounted on an inside of the panel plate,
wherein the plurality of attachment devices comprise at least one locking device for mounting and locking a casing to a suspension, the device comprising:
a body including a first portion engaging a first side of the suspension and a second portion connected to the first portion, the second portion extending from the first portion; and
a locking element mounted to the second portion at a distance from the first portion, wherein the distance is such that the locking element engages a second side of the suspension at least before the first portion disengages the first side of the suspension,
wherein the locking element is biased to a first position where the locking element projects over the second portion in the extension direction of the first portion to engage with the second side of the suspension, and
wherein the locking element is moved to a second retracted position by overcoming the biasing force in the direction of the second portion to release the suspension.

9. Casing according to claim 8, wherein the at least one locking device is arranged in a lower area of the panel plate.

10. System, comprising:
a suspension; and
a casing for mounting on a suspension, comprising:
a panel plate; and
a plurality of attachment devices mounted on an inside of the panel plate,
wherein the plurality of attachment devices comprise at least one locking device for mounting and locking a casing to a suspension, the device comprising:
a body including a first portion engaging a first side of the suspension and a second portion connected to the first portion, the second portion extending from the first portion; and
a locking element mounted to the second portion at a distance from the first portion, wherein the distance is such that the locking element engages a second side of the suspension at least before the first portion disengages the first side of the suspension,
wherein the locking element is biased to a first position where the locking element projects over the second portion in the extension direction of the first portion to engage with the second side of the suspension, and
wherein the locking element is moved to a second retracted position by overcoming the biasing force in the direction of the second portion to release the suspension;
wherein the casing is arranged on the suspension and locked to the suspension.

11. Device for unlocking a locking device for mounting and locking a casing to a suspension, the locking device comprising:
a first portion arranged to engage a first side of the suspension;
a second portion effectively connected to the first portion; and
a locking element arranged on the second portion at a distance from the first portion, wherein the distance is such that the locking element engages a second side of the suspension at least before the first portion disengages the first side of the suspension,
wherein the locking element is biased to a first position where the locking element projects over the second portion in the extension direction of the first portion in order to allow engagement with the second side of the suspension, and
wherein the locking element can be moved to a second retracted position by overcoming the biasing force in the direction of the second portion to release the suspension;
wherein the device for unlocking is mounted on a casing and comprises:
an U-shaped body comprising a first leg and a second leg comprising a distance to each other determined by a thickness of the casing and/or a thickness of the second portion of the body of the locking device,
wherein the legs comprise a length selected to receive part of the casing and part of the second portion of the locking device such that an upper end of a leg partly engages the locking element to move the locking element in a direction opposite to the first direction.

12. Device according to claim 11, wherein the legs of the U-shaped body are biased towards each other for effecting clamping the device with the casing and the locking device, so that during usage the device remains, without additional appliances, at a position in which the device engages the connecting element.

13. Device according to claim 11, wherein at least one of the legs comprises a mark indicating to a user where the device is to be attached to the casing.

14. Device according to claim 13, wherein the mark comprises a notch.

15. Device according to claim 11, wherein the U-shaped body is made of plastic.

* * * * *